March 15, 1938.  B. W. HENDERSON  2,110,909
DAIRY STALL AND EQUIPMENT THEREFOR
Filed Jan. 30, 1936
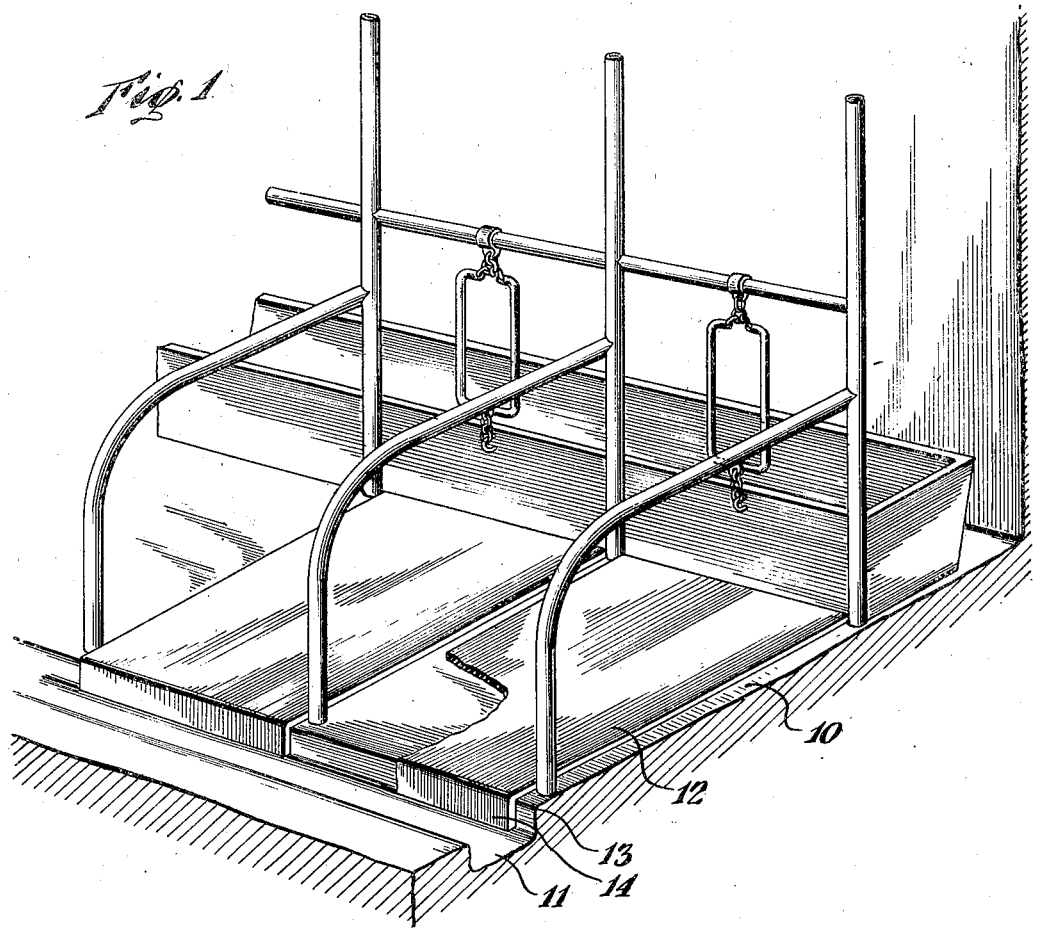
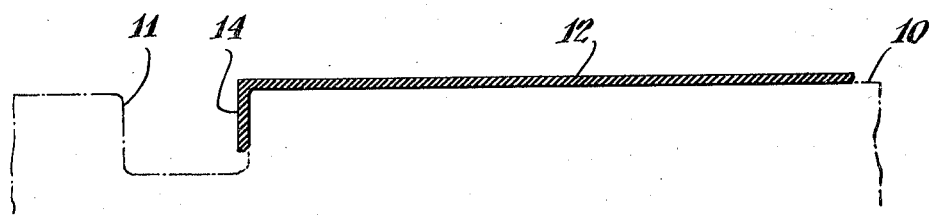

Patented Mar. 15, 1938

2,110,909

UNITED STATES PATENT OFFICE 2,110,909

DAIRY STALL AND EQUIPMENT THEREFOR

Bancroft W. Henderson, Montclair, N. J.

Application January 30, 1936, Serial No. 61,523

5 Claims. (Cl. 119—28)

This invention relates to dairy stalls and equipment therefor, and more particularly to a mat of cushioning and heat insulating material which is useful as a floor covering in such a stall.

A general object of the invention is to provide a cushioned and heat insulated dairy stall which, by ministering to the comfort and conserving the energy of the cow, induces more efficient and increased milk production.

In the ordinary construction of dairy stalls, where the flooring comprises concrete, cork brick, or like relatively hard substances, the animals quartered therein develop painful enlarged hocks and knees. Also, when reposing, their udder and milk veins can contact the floor, thus losing body heat. Such hard floors further engender loss of energy by causing sore feet with consequent restless movement of the animal while standing. The curb edge at the gutter which runs along the back of most stalls is also a source of irritation which causes flank sores, bruises and udder sores when the reposing animal moves so as to rub or bump against it.

The use of straw bedding or the like does not sufficiently ameliorate these conditions, and is expensive.

With such drawbacks of the usual previously known stall constructions in view, particular objects of the present invention are to provide an improved stall having at least the rear portion thereof equipped with a covering of cushioning and heat insulating material such as resilient rubber, which preferably also overlies and guards the curb edge, whereby such previously encountered ailments are prevented or relieved, and a greater percentage of consumed food is made available for milk production through reduction of the loss of heat energy and abatement of restless energy consuming movement. This avoidance or relief of painfully enlarged hocks, sores, etc., also aids milk production since, as is generally recognized, contented cows are better producers.

Further objects of the invention are to provide a sanitary, readily washable stall floor covering and to eliminate the need for straw or like bedding.

Yet another object is to provide a cushioning and heat insulating stall floor covering in the form of a separate unit which can be applied readily to existing stalls, and which is economical in use.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawing, in which:

Fig. 1 is a fragmentary view of the interior of a barn showing stalls embodying the features and equipment of the present invention; and Fig. 2 is a fragmentary longitudinal sectional view through the rear portion of a mat constructed in accordance with the invention, showing the same in position with respect to a stall floor and gutter, the latter being indicated in dotted lines.

Referring more particularly to the drawing, there is shown in Fig. 1 a dairy stall, the floor 10 of which may be constructed of concrete, cork brick or the like. A gutter 11 runs along the rear end of such stall. These and other usual features of the stall may follow any conventional or suitable construction. Advantages and benefits of the present invention flow from ameliorating or modifying the base floor and gutter curb surfaces of such stalls when these are formed of relatively hard material and in the present specification and claims reference to such "relatively hard material" contemplates substances heretofore in common use such as concrete, cork brick, wood, wood brick, or the like. These substances are all relatively hard as compared with the protective surface flooring provided by the present invention which is of soft, resilient, flexible heat-insulating material which, unlike the relatively hard base floor substances, is capable of yielding to the pressure of the animals' hoofs or body.

In accordance with the present invention, at least the rear portion of the stall flooring is provided with a cushioning and heat insulating cover. In the illustrated embodiment this cover comprises a flat portion 12 which is of sufficient length to extend from the curb 13 at the rear of the stall forwardly at least some distance beyond the knees of the hind legs of a reclining animal quartered in the stall. This length, for example, may vary from three to five and one-half feet, depending on the measurements of the stall. It is also contemplated that the cushioning mat may, if desired, extend along the entire length of the stall to prevent or relieve sore forefeet, although substantial benefits of the invention are obtainable with the shorter length. The width of the covering may vary from three to four feet depending upon the width of the stall.

The covering is preferably formed of rubber which is vulcanized so as to be somewhat resilient. With moderately resilient rubber a pad thickness of one-quarter of an inch is sufficient to give the needed cushioning properties, although this thickness may be varied in accordance with the type of rubber used and with other factors such as desired resiliency, required length of wear, etc. Since rubber is a poor conductor of heat, the mat also has heat insulating properties which enable it to protect the cow's udder from contact with the relatively cold flooring 10. While at the present time rubber is a preferred material, the mat may be constructed of other materials such as suitable synthetic compositions or the like, having the required cushioning and/or heat insulating properties.

Along its rear edge the mat preferably has a downwardly extending integral flange 14 which is molded at right angles to the flat floor covering portion 12 in order to overlie an adjacent wall of the gutter 11 and to cover and guard the upper edge of the curb 13 so that the animal cannot bruise or injure itself thereon. This flange also serves readily to locate the mat with respect to the stall floor. No particular affixing means is needed for holding the mat in place, but if desired, suitable fastenings may be used or its underside may be equipped with suction depressions (not shown).

The upper surface of the portion 12 and outer surface of flange 14 are made smooth for sanitary purposes.

While the cushioning and heat insulating stall floor covering is preferably made in the form of a separate mat unit as described above, in order that it may readily be applied to existing stalls, it also may be built into the stall as an integral part of its floor construction if desired.

A stall constructed or equipped in the above described manner is suited to fulfill its intended functions in preventing or relieving painful ailments to the animal, reducing needless expenditure of energy, and in generally ministering to its comfort, all with the desired effect of increasing its milk production. Such a stall also eliminates the need for straw bedding or the like, thus eliminating a serious item of expense, reducing the need for storage space for such bedding, and avoiding considerable labor. The stall has the further advantage of being sanitary and easily washable.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A mat for a cow stall floor, consisting of a sheet of rubber having at one end thereof a flange lying in a single plane, said flange being adapted to cover the curb edge of a stall and the adjacent wall of said curb, and the remaining portion of the sheet being adapted to cover a portion of the floor normally occupied by at least the rear portion of the animal.

2. The combination with a cow stall having a base floor of a relatively hard material, of a surface floor of smooth, soft, resilient, flexible, heat-insulating material, said surface floor having a flange at one end thereof in a plane at an angle to the remainder of the surface floor, whereby the curb and floor of the stall constitute a protective device.

3. The combination with a cow stall having a curbed gutter at its rear end in which the base floor and curb are of relatively hard material, of a mat consisting of a sheet of cushioning rubber having at one end thereof a flange lying in a single plane, said flange being adapted to cover the curb edge of said stall and the adjacent wall of said curb, the remaining portion of said sheet being adapted to cover a portion of the floor normally occupied by at least the rear portion of the animal quartered in said stall.

4. A surface flooring applicable to a cow stall having a curbed gutter at its rear end, comprising a unitary pre-formed sheet of smooth, soft, resilient, flexible, heat-insulating material having a flange at one end thereof in a plane at an angle to the remainder of the sheet, said sheet and its flange being adapted to overlie the base floor and curb of such a stall so as to constitute a protective device for an animal quartered therein.

5. The combination with a cow stall having a curbed gutter at its rear end in which the base floor and curb are of relatively hard material, of a surface floor of yieldable resilient rubber having a flange at one end thereof in a plane at an angle to the remainder of the surface floor, said flange overlying the edge and adjacent wall of said curb whereby the curb and floor of the stall constitute a protective device, said surface floor being permanently secured against said base floor and curb.

BANCROFT W. HENDERSON.